United States Patent [19]

Rakow et al.

[11] Patent Number: 4,744,996

[45] Date of Patent: May 17, 1988

[54] METHOD FOR PRODUCING MICROALGAE BASED FOODSTUFF

[76] Inventors: Allen L. Rakow, 620 Monte Vista; Rudolph Roubicek, 1304 Delano Dr., both of Las Cruces, N. Mex. 88001

[21] Appl. No.: 878,645

[22] Filed: Jun. 26, 1986

Related U.S. Application Data

[63] Continuation-in-part of Ser. No. 707,461, Mar. 1, 1985, abandoned.

[51] Int. Cl.$^4$ ............................................... A23L 1/04
[52] U.S. Cl. ..................................... 426/575; 426/615
[58] Field of Search ................ 426/575, 573, 615, 804

[56] References Cited

FOREIGN PATENT DOCUMENTS

| | | | |
|---|---|---|---|
| 53-38652 | 4/1978 | Japan | 426/615 |
| 53-139738 | 12/1978 | Japan | 426/615 |
| 56-45170 | 4/1981 | Japan | 426/575 |
| 57-50863 | 3/1982 | Japan | 426/575 |
| 59-63146 | 4/1984 | Japan | 426/575 |

*Primary Examiner*—George Yeung
*Attorney, Agent, or Firm*—Milton D. Wyrick

[57] ABSTRACT

A method for producing a microalgae based foodstuff is disclosed wherein a mixture containing water as a solvent, Spirulina cells, and a gelling agent comprising either agar or a mixture of agar and cornstarch is heated to a temperature of 100° Centigrade or more. After the heated mixture is cooled to a temperature of 40° Centigrade or less, the mixture is then placed into a shaping device. The cooled mixture in the shaping device is then dried to a predetermined moisture content and the resulting dried, shaped mixture is removed from the shaping device.

1 Claim, No Drawings

METHOD FOR PRODUCING MICROALGAE BASED FOODSTUFF

This application is a continuation-in-part of our co-pending application, Ser. No. 707,461, filed Mar. 1, 1985, now abandoned.

FIELD OF INVENTION

The present invention relates to foodstuffs comprised of naturally or commercially produced algae, and more particularly to foodstuffs based on microalgae containing a substantial amount of protein and nutrients.

BACKGROUND OF THE INVENTION

An algae based food, popular for centuries in the Far East, is made of an edible macroalgae (seaweed) of the genus Porphyra which is processed and dried into sheets. This foodstuff, known as "Nori" in Japan, and by other names in other Far Eastern countries, is gaining in popularity with the people of Western countries. Nori is particularly notable for its high strength-to-weight ratio. In its standard thin-sheet form, it cannot easily be pulled apart, allowing it to be wrapped around other foods, such as sushi. The standard sheet size of Nori is 18 by 20 centimeters. Such a sheet weighs 3 to 4 grams. Such sheets are possible because the macroalgae cells are relatively large, and naturally bind together when taken from a wetted state to a dried state. In recent years, the general quality of Nori has deteriorated because of factors such as industrial pollution, adverse weather, and disease. It is not unusual for lower quality Nori to contain embedded debris in its sheets, such as pieces of nylon nets, hair, and marine organisms.

To use another substance in place of macroalgae, some means, such as a gelling agent, would be required to bind the particles together. It is well known that microalgae are high in protein content and can be economically produced commercially, in a clean, controlled, environment.

Applications of microalgae and gelling agents are, of course, well known in the prior art. In particular, gelling agents are employed routinely in jellies and puddings. A useful example is the use of the gelling agents carageenan, pharcellan, agar, gelatin or pectin in a custard pudding composition (Japanese Pat. No. 56-45170 to Asahi).

Microalgae has recently become well known as both a human and animal foodstuff because of its relatively high protein value. However, because some species are difficult to digest, the microalgae must be treated to make them suitable for digestion. The microalgae of the genus Chorella have been heat treated in an aqueous alkaline solution to make them digestive and palatable (Japanese Pat. No. 53-38652 to Sato).

The prior art also discloses an animal feed composition, wherein microalgae from the group consisting of *Anabaena flos-aquae, Clothrix scopulorm*, and *Chlorella vulgaris* is dispersed in a hydrophilic polymer solution which is contacted with a gelling solution. This procedure encapsulates the algae, which multiply upon exposure to light (Japanese Pat. No. 59-63146 to Matsunaga).

The pertinent prior art, either singly or in combination, fails to teach or even suggest the combination of microalgae, gelling agent and water to create a foodstuff having characteristics resembling the thin-sheet Japanese Nori product, with the inherent strength to resist being pulled apart and the flexibility to be wrapped about other foods easily and without breaking.

It is desirable to produce a microalgae based foodstuff using natural ingredients which is both nutritious and palatable. It is also desirable to produce an algae based foodstuff which is substantially free from the effects of industrial pollution, adverse weather, and plant disease. It is further desirable to provide a foodstuff which can be utilized in similar applications to those of the Japanese macroalgae based foodstuff, Nori.

These and other undesirable problems of the prior art are overcome by the present invention, and an improved algae based foodstuff is provided.

SUMMARY OF THE INVENTION

To achieve the foregoing and other objects, and in accordance with the purposes of the present invention, as embodied and broadly described herein, the apparatus of this invention may comprise a composition as a substitute for the traditional macroalgae product (Nori). The microalgae, Spirulina, is combined in water as a solvent with a gelling agent, and subsequently formed into the desired shape and dried. The hydrophillic structure of this composition enhances the distribution of water-soluble additives, such as nutrients of vitamins and minerals, colorings and flavorings, making the composition potentially more nutritious, interesting and palatable than the traditional macroalgae product (Nori), but possessing characteristics of strength and flexibility similar to Nori. The industrially controlled process for the microalgal constituent of this invention, however, affords a significant improvement over Nori, since purity can be maintained.

DETAILED DESCRIPTION OF THE INVENTION

To create a foodstuff similar but superior to Nori, microalgae were considered. It is well known that microalgae can be commercially produced in a clean, controlled environment. However, it was discovered that only one member of the microalgae family could be utilized in a manner similar to the macroalgae used for Nori. This results from the requirement for a long, filamentous species, to allow for strength and flexibility which requirement is met by Spirulina. Another species, Chlorella, is unsatisfactory because it consists of small, rigid spheres which flocculate easily to form large, globular masses, severely hampering flexibility.

In order to use microalgae in a manner similar to the use of macroalgae in Nori, a means of binding the microalgae particles together was needed. Although a gelling agent was required, it was difficult to ascertain the particular agent best suited for this use. It was found that the gelling agent, agar, was the agent which provided the desired high strength-to-weight ratio necessary to form a thin sheet with the necessary properties. When the gelling agent, carageenan, was used, the proportion of microalgae to gelling agent was substantially reduced. The resulting sheet was thick and too stiff to be properly rolled around another food.

The proper composition results in a nutritious foodstuff that can be utilized in the same manner as the traditional macroalgae, PorPhyra product (Nori). The microalgae is combined with a solution of a gelling agent and water. The resulting solution is then placed into molds and cooled. After gelling, the gel is dried to produce the final product. Natural ingredients are used throughout.

As described herein, Spirulina was selected because it can be efficiently and cleanly produced in a commercial environment and comprises long, filamentous cells. Microalgae are high in protein content and result in a product which appears and behaves in a manner similar to the traditional product (Nori), without the problems of environmental contamination often found in that product.

Much investigation was conducted into particular gelling agents before a suitable agent, agar, was determined. Experiments were conducted using other agents as well. It was determined that a concentraton of gelatin many times that of agar was required to achieve a similar result. Experiments using various concentrations of the gelling agent, carageenan were conducted, but each produced an inferior product: stiff, difficult to bite, and producing a disagreeable, mucilaginous texture in the mouth, and having a lower protein content than the preferred embodiment.

The preferred agent, agar, can be commercially extracted from a number of macroalgae. Further testing has shown that a more economical, but acceptable product can be obtained utilizing a matrix comprising, 50% to 100% by weight agar and 0% to 50% by weight cornstarch.

Vitamins, minerals, flavorings and colorings can be easily added during processing. These additives can be easily obtained from commercial sources.

In one embodiment, a solution is prepared consisting of the following ingredients by weight:
98.0%: Water
0.8%: Spirulina
1.2%: Agar The agar and water are heated and mixed at 121° Centigrade for thirty (30) minutes to completely solubilize the agar. The solution is then cooled to 70° Centigrade, at which time Spirulina is added and mixed for fifteen (15) minutes. After cooling to 40° Centigrade, the solution is then poured into individual molds and cooled to below 40° Centigrade, where a sol-gel transformation occurs. The still wet gel is then placed between two screens and inserted into a drying system. After drying, the resulting product has a water content less than 20%. The molds could produce gels of flat sheets or larger, block-like forms, which could be sliced into thin sheets. These block forms could also be used as a foodstuff, whose appearance would be similar to Yokan, a Japanese jelly cake product.

Alternatively, the heated mixture, having a considerably higher concentration of Spirulina and agar, could be extruded through a heated die, at a determined shear rate, in the form of a visco-elastic fluid, and dried. The mixture could also be calendered between pairs of heated rollers to produce a flat sheet which would be dried and cut. Still further, a form could be dipped into the solution successively to create the desired shape on the form. After separation from the form, the gel would be dried as above described.

The degree of cooling and drying in each embodiment varies according to the composition of the mixture, the process temperature, and the shear rate, and according to the desired moisture content of the final product. The addition of water-soluble vitamins, minerals, flavorings and colorings, if desired, could be accomplished by adding to the mixture prior to processing into the desired shape. Distribution of such substances is enhanced by the hydrophlilic structure created by the agar.

The final product has characteristics which are similar to those of the traditional macroalgae product (Nori), without any of its undesirable properties. It can be used in any of the applications in which Nori is currently utilized.

The foregoing description of the preferred embodiments of the present invention has been presented for purposes of illustration and description. It is not intended to be exhaustive or to limit the present invention to the precise forms disclosed; obviously, many modifications and variations are possible in light of the above teaching. The embodiments were chosen and described in order to best explain the principles of the present invention and its practical application to thereby enable others skilled in the art to best utilize the present invention in various embodiments and with various modifications as are suited to the particular use contemplated. It is intended that the scope of the present invention be defined by the claim appended hereto.

What is claimed is:

1. A method for producing a microalgae based foodstuff comprising:
preparing a mixture containing by weight 50%–98% water, 0.8%–20% Spirulina cells, and 1.2%–30% of a matrix comprising by weight 50%–100% agar and 0%–50% cornstarch;
heating the mixture to a temperature 100° Centigrade, or more;
cooling the heated mixture to a temperature of 40° Centigrade or less;
placing the cooled mixture into shaping means;
drying the cooled mixture in said shaping means to a predetermined moisture content;
and removing the resulting dried, shaped mixture from said shaping means.

* * * * *